UNITED STATES PATENT OFFICE.

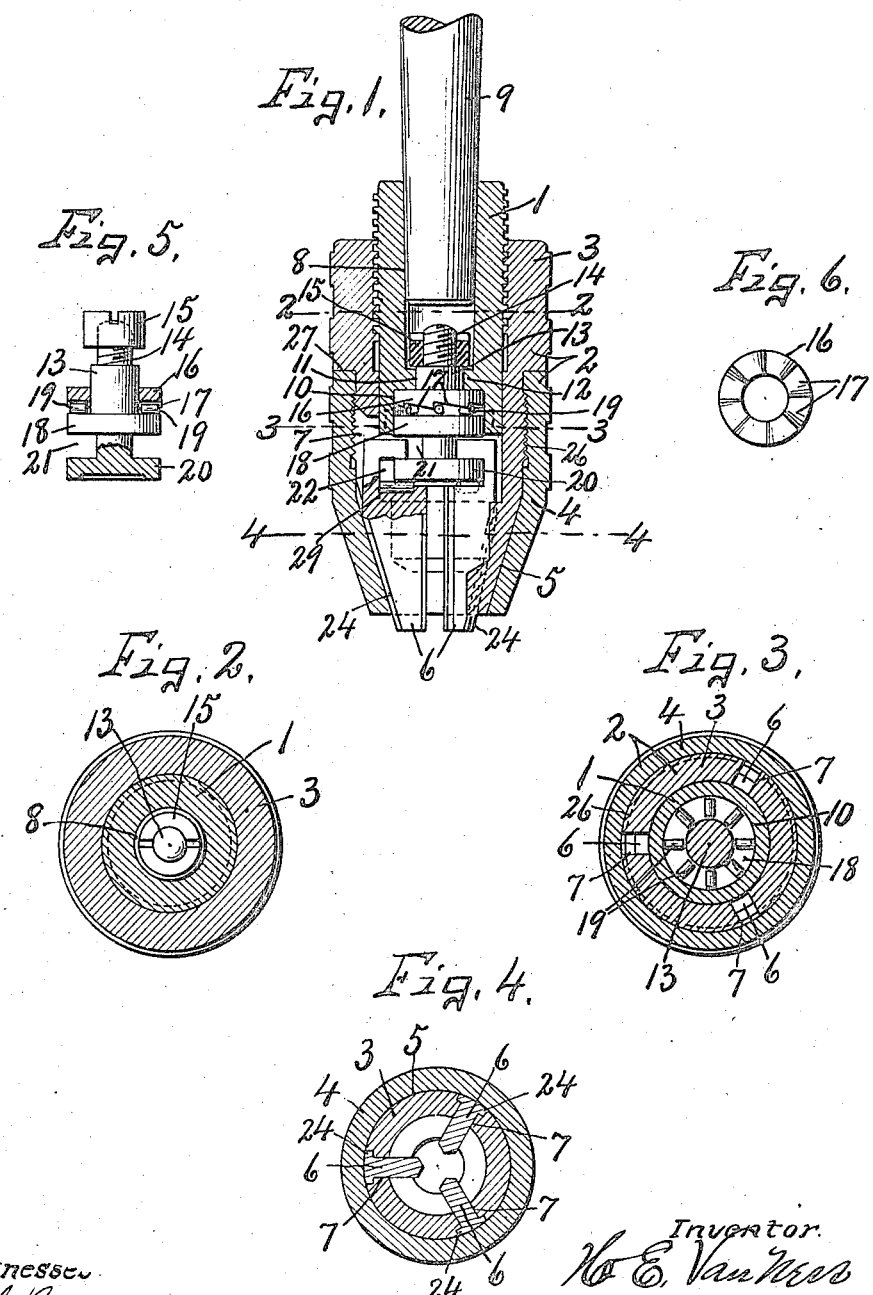

HENRY E. VAN NESS, OF ELMIRA, NEW YORK, ASSIGNOR TO E. HORTON & SON COMPANY, OF WINDSOR LOCKS, CONNECTICUT, A CORPORATION OF CONNECTICUT.

DRILL-CHUCK.

1,159,344.

Specification of Letters Patent.    Patented Nov. 2, 1915.

Application filed July 27, 1909. Serial No. 509,322.

*To all whom it may concern:*

Be it known that I, HENRY E. VAN NESS, of Elmira, in the county of Chemung, in the State of New York, have invented new and useful Improvements in Drill-Chucks, of which the following, taken in connection with the accompanying drawings, is a full, clear, and exact description.

This invention relates to certain improvements in drill chucks involving the use of radially movable jaws arranged about a common axis, and coöperating threaded members screwing one upon the other and operatively connected to said movable jaws for effecting the radial movement of the latter toward and from said axis. These jaws are tightened upon and released from the work, such as a drill or bit, by the hand rotation of one of the threaded members upon the other, and it frequently happens that during the drilling operation the jaws become so firmly set upon the drill as to make it practically impossible, or at least very difficult, to turn or unscrew the outer threaded member or casing by hand for the purpose of releasing the drill or bit from the jaws.

My object, therefore, is to provide the drill chuck with a simple, economic and durable attachment by which the jaws, however firmly set they may become upon the drill or bit, may be easily and quickly released from holding engagement with such drill by a slight turn of the outer sleeve or casing by hand and with a minimum degree of power.

Another object is to enable this attachment to be readily applied to drill chucks of this character without material alteration of any of the mechanism.

Other objects and uses will be brought out in the following description:

In the drawings, Figure 1 is a vertical sectional view of a drill chuck embodying the various features of my invention, the particular attachment for releasing the jaws being shown in elevation. Figs. 2, 3 and 4 are sectional views taken respectively on lines 2—2, 3—3 and 4—4, Fig. 1. Fig. 5 is an elevation partly in section of the detached central jaw supporting spindle and my improved releasing attachment coöperating therewith. Fig. 6 is an inverted plan of the detached cam disk constituting one of the essential elements of my invention.

This chuck comprises an externally threaded head —1—, an external casing —2— composed of a sleeve —3— threaded internally at one end and engaged with the threaded portion of the head —1— and a cap —4— having a tapering or conical bearing —5— for engaging the outer tapering edges of a series of, in this instance three, radially movable jaws —6— which are guided in radial slots —7— in the lower end of the sleeve —3—.

The head —1— is provided with a central lengthwise socket —8— for receiving a tapering spindle —9— which is adapted to be secured in any well known manner to the rotary drill spindle, not shown, and is adapted to fit tightly by friction in the socket —8— to impart rotary motion to the head —1—. The lower end of the head —1— is provided with a cylindrical socket —10— terminating a short distance from the lower end of the socket —8— but connected thereto by a reduced opening —11—, thereby forming an annular flange —12— between the sockets —8— and —10—. Journaled in the opening —11— is a rotary axially movable spindle —13— having a reduced threaded end —14— engaged by a nut —15— which plays in the lower end of the socket —8— just above the flange —12—, said nut being of slightly greater diameter than the opening —11— to prevent undue downward movement of the spindle —13—.

A cam disk —16— of substantially the same diameter as the socket —10— is loosely seated in the upper end of said socket and against the under side of the annular flange —12— around the adjacent portion of the spindle —13— and is provided on its lower face with a series of inclined bearings —17— coacting with the upper flat face of an annular flange —18— which is rigidly secured to and preferably forms an integral part of the spindle —13—, said flange —18— being also loosely fitted in the lower end of the socket —10—. Interposed between the inclined bearings —17— and adjacent upper face of the flange —18— is a series of roller bearings —19— which normally assume a position at the highest end of the inclined bearings —17— when the jaws are released, thereby permitting a slight elevation of the spindle —13— and jaws —6— connected thereto to free the jaws from holding engagement upon the drill. The cam bearings —17— incline upwardly to the left or in the direction of rotation of the casing —2— and spindle —13— when turned to the left to release the jaws. This spindle —13— is provided at its lower end with an annular flange —20— spaced some distance apart from the flange —18— forming an intervening annular groove —21— between said flanges for the reception of portions of the jaws —6—. These jaws are provided near their upper ends with recesses —22— opening from their inner edges, said recesses being of substantially the same vertical width as the flange —20— which they are adapted to receive so as to lock the jaws to the spindle against endwise movement relatively thereto and at the same time forming a guide or rest upon which the jaws may slide radially.

The jaws —6— are spaced a uniform distance apart about a common center or axis of the spindle —13— and ride in lengthwise radial grooves —7— in the lower portion of the casing section or sleeve —3—, the outer sides of said grooves being enlarged laterally for receiving flanged ribs —24— on the outer tapering edges of the jaws. The tapering outer edges of the jaws are engaged by a tapering portion —5— of the cap —4— which prevents outward radial displacement of the jaws and together with the ribs —24— engaging the outer enlarged portions of the slots —23— constitute means for moving the jaws radially as the casing —2— is screwed up and down upon the head —1—. The upper portion of the cap —4— is cylindrical and threaded internally for engaging an externally threaded portion —26— of the sleeve —3—, this portion of the sleeve being reduced in diameter forming an annular shoulder —27— against which the adjacent end of the cap —4— abuts when screwed up tightly upon the sleeve —3—. The lower ends of the sleeve —3— and cap —4— are tapered to closely fit one upon the other with their lower ends in coincident planes when adjusted for use.

It is now apparent that the casing —2— including the sleeve —3— and cap —4— are rotatable bodily upon the head —1— and during such rotation are moved upwardly and downwardly according to the direction of rotation, thereby moving the jaws radially. That is, when the casing is rotated to the right it is simultaneously moved upwardly, thereby closing the jaws upon the drill, while on the other hand, when the casing is rotated to the left, the casing will be moved downwardly thereby moving the jaws outwardly or from each other to release the drill. During such rotation of the casing —2— similar rotary motion will be imparted to the jaws by reason of the latter being seated in the radial grooves —7—, and when the casing is turned to the right to tighten the jaws upon the drill, it is evident that the portions of the jaws underlying the flange —20— will engage the under side of said flange with considerable pressure, thereby tending to rotate the spindle —13— in the same direction, or to the right, and in order to reduce the friction between the jaws and flange —20— I provide suitable anti-friction rollers —29— which are seated in suitable grooves in the adjacent horizontal portions of the jaws directly under the flange —20—. This tendency of the spindle —13— to rotate to the right when tightening the jaws upon the drill causes the rollers —19— to roll from their normal position along the inclined bearings —17—, thereby additionally forcing the spindle —13— and jaws —20— downwardly a slight distance, or until the play between the nut —15— and upper face of the flange —12— is taken up, and at the same time frictionally forcing the disk —16—, through which the spindle plays, against the lower side of said flange —12—. This frictional engagement of the disk —16— with the lower side of the flange tends to hold said disk against rotation while the spindle —13— is being rotated by the rotation of the casing —2— in tightening the jaws upon the drill, during which operation the rollers —19— travel from the high ends of the inclined bearings —17— toward their low ends, thereby additionally tightening the jaws upon the drill.

During the drilling operation the tendency is to further rotate the spindle —13— to the right, thereby further tightening the jaws upon the drill. This setting of the jaws during the drilling operation makes it difficult to release them from the drill without considerable power applied to turn the casing —2— to the left, but this difficulty of operation is greatly diminished by the use of the rollers —19— and cam disk —16— by reason of the fact that the use of the rollers materially reduces the friction between the disks —16— and —18— thereby permitting the casing —2— and jaws which are locked thereto, together with the spindle —13—, to be rotated to the left with greater freedom, and during such rotation the shifting of the rollers from the low points of the cam faces —17— to the high points, allows a slight endwise play of the spindle —13— upwardly, thereby carrying the jaws with it and freeing said jaws from engagement with the drill, thus reducing the resistance to turning of the casing —2— to the left in order to further open the jaws and permit the releasing of the drill therefrom.

The operation of my invention will now be readily understood upon reference to the foregoing description and accompanying drawings, and while the cam disk —16— is particularly effective in combination with the rollers —19— in effecting a quick release of the jaws from their holding position upon the drill with a minimum turning power applied to the casing, it is evident that some slight modifications may be made to accomplish the same result without departing from the spirit of my invention. It is also evident that the friction between the jaws —6— and lower face of the flange —20— may be reduced by recessing the central portion of the lower face of said flange and thereby reducing the radial width of the bearing for the rollers —29—, as best seen in Fig. 5. For example, in further describing the operation of the chuck and the manner in which the several parts coöperate in applying and releasing it to and from a tool, attention is called to the fact that the cam faces of the disk —16— incline in a direction opposite to that of the threads of the head so that when the jaws are closed upon the drill by the hand rotation of the casing and the drill moved into the work, the upward pressure of the jaws against the flange —20— of the spindle —13— tends to rotate such spindle and also tends to screw up the casing but this tendency is instantly counteracted by the action of the rollers against the inclines —17— which absolutely locks the casing against upward screwing and thereby prevents frictional binding of the threads. This tendency to rotation produces a torsional or twisting strain upon the casing by which action the rollers are caused to shift a very slight distance from their normal positions down the inclines, thereby throwing practically the entire pressure of drilling on the rollers and inclines of the disk with the rollers slightly advanced from their normal position at the upper ends of the inclines ready to return to such normal positions under such pressure and permits the casing to be easily turned by hand in further releasing the jaws.

What I claim is—

1. In a drill chuck, a threaded head, a spindle journaled in the head and having a slight axial movement relatively thereto, radially movable jaws engaging the spindle, a threaded casing screwed upon the head and operatively connected to the jaws to move the latter radially as the casing is rotated on the head, and means including a cam disk on the head for moving the spindle and jaws axially as the casing is rotated.

2. A drill chuck comprising a threaded head and a threaded casing screwed thereon, a spindle mounted in the head coaxially therewith, jaws engaged with the spindle and movable radially by the rotation of the casing on the head, and separate means coacting with the spindle and brought into action by a slight unscrewing motion of the casing for releasing the jaws from their tightened position with a quicker action than that accomplished by the threads of the head and casing.

3. In a drill chuck of the class described, a threaded head, a spindle journaled in the head coaxial therewith, annular flanges rigid on the spindle and spaced apart, a cam disk on the head and provided with an inclined bearing facing one of the flanges, rollers between said inclined bearing and such flange, radially movable jaws engaging opposite faces of the other flange, and an internally threaded casing screwing upon the threaded head and provided with means for moving the jaws radially as the casing is rotated.

4. In a drill chuck, an externally threaded head, a spindle journaled in the head coaxial therewith and having a limited axial movement, a cam disk loosely mounted upon the spindle and engaging said head, radially movable jaws operatively connected to the spindle, an internally threaded casing screwing upon the threaded portion of the head and operatively connected to said jaws to move them radially, an annular flange on the spindle, and roller bearings between the flange and cam disk for effecting a limited axial movement of the spindle and jaws as the casing is rotated.

5. In a drill chuck, a head having a socket in its lower end, a spindle coaxial with and journaled in the head, a cam disk seated in said socket and having its lower face provided with an inclined bearing, an annular flange on the spindle adjacent to said inclined bearing, rollers between the inclined bearing and annular flange, a second annular flange rigid with the spindle, jaws engaging the opposite end face of the second flange and movable radially, and a casing screwed upon the head and operatively connected to the jaws to move them radially.

6. In a drill chuck a threaded head and a threaded casing screwed thereon, jaws guided in the casing, a spindle rotatable in the head and connected with the jaws, said spindle having a limited axial movement in the head for effecting a limited endwise movement of the jaws independently of the head, and means brought into action by a limited rotation of the casing with respect to the head for effecting the endwise movement of the spindle and jaws connected thereto independently of the head.

7. In a drill chuck, a main head, an auxiliary head coaxial with and movable relative to the main head, jaws, connections between said jaws and auxiliary head, means acting initially to move said jaws radially relatively to the auxiliary head and into engagement with the object to be held and thereafter to actuate said connections so as to frictionally engage said jaws with said auxiliary head to rotate the same, and further means actuated by the independent rotation of said auxiliary head for moving the latter slightly axially and thereby cause the jaws to further tighten upon the work.

In witness whereof I have hereunto set my hand this 17th day of July, 1909.

HENRY E. VAN NESS.

Witnesses:
H. E. CHASE,
J. M. HOES.

Copies of this patent may be obtained for five cents each, by addressing the "Commissioner of Patents, Washington, D. C."